United States Patent Office

2,876,101
Patented Mar. 3, 1959

2,876,101

DIETETIC GELLED PECTIN CONTAINING FOOD COMPOSITION

Irene D. Bliudzius and Pranas Jucaitis, Chicago, Ill., and Norman P. Rockwell, Wilmington, Del., assignors, by direct and mesne assignments, to E. I. du Pont de Nemours and Company, Wilmington, Del., a corporation of Delaware No Drawing. Application March 25, 1957
Serial No. 647,960

8 Claims. (Cl. 99—129)

This invention is directed to low calorie and dietetic gelled food products which contain a Polyose used as pectin-gelling agent.

A pectin-gelling agent, for purposes of this application, is a substance which, like sugar has the effect of making pectin-gel in conventional pectin containing foodstuffs, such as jellies, jams, preserves, marmalades, and butters. Pectin is usually considered to be a methylester of polygalacturonic acid. It has the capacity to form gels in association with sugar and acid or the acid juices of fruits. In order for pectin to form gels in conventional pectin containing foodstuffs, high concentrations of sugar are required as a pectin-gelling agent.

Because dietetic gelled food compositions contain a low concentration of sugar, pectin has heretofore been an unsatisfactory gel former in such foodstuffs. Other gel forming substances used in place of natural pectin, such as seaweed extractives, low methoxy pectin, and various natural gums, have not been satisfactory. Syneresis is common. Use of such pectin substitutes in dietetic gelled foodstuffs frequently results in food products having such altered physical properties and color characteristics that the dietetic food products bears only faint resemblance to the normal sugar and pectin containing counter-part.

This invention relates to dietetic pectin containing gelled food compositions in which a non-nutritive pectin-gelling agent is used. Such compositions have a volume consistency and appearance comparable to gelled food compositions containing sugar as pectin-gelling agent. These non-nutritive gelling agents are used just like sugar. One may add to the non-nutritive gelling agent a non-caloric sweetener to obtain a sweetness level which one is accustomed to obtain with sugar when it is added in the same fashion. Thus, low calorie and dietetic food compositions are made which are easily and pleasantly usable as normal carbohydrate-containing foodstuffs.

Pectin containing gelled foodstuffs which can be prepared using a Polyose as a pectin gelling agent include jellies, jams, preserves, marmalades and butters. Such foodstuffs are normally made by boiling fruit juice and sugar, or fruit and sugar, until these ingredients reach a stage when they will form a gel. In order to form a gel, pectin is sometimes added to the ingredients.

A Polyose can be used as a pectin-gelling agent for dietetic food compositions because it is non-nutritive.

A Polyose is a glucose polymer derived from starch by depolymerization followed by heat polymerization as described in detail in the Durand Patent 2,563,014. The Polyoses are sold by the Corn Products Refining Company. The Polyoses have a considerable different susceptibility to amylolytic enzymes than the original starch or its conventional degradation products. The products on test contain groups which act very much like small amounts of reducing sugar, not in excess of about 5 to 7 percent in Polyose A. The reducing sugar is not construed as due to the presence of free glucose.

A preferred Polyose for purposes of the invention is Polyose A which can be described as a glucose polymer derived from starch by depolymerization followed by heat polymerization to such an extent that at 67 percent solids it gives a viscosity (Brookfield) of 20–100 poises at 70° F. More viscous Polyoses can be used. Polyose C requires 50 percent, Polyose B, 60 percent, and Polyose D requires only 40 percent of solids to give the viscosity described.

The amount of Polyose required to form a gel is not strictly related to the amount of sugar normally used in the conventional products, but will depend to a greater extent upon the amount of pectin and acidity present, the processing conditions employed, and other gelling agents used besides pectin. The amount of Polyose used is further dependent upon the particular grade and concentration of Polyose used. Broadly, the amount of Polyose that can be used in these products will vary from about 10 to 75 percent by weight of the finished product. A preferred and narrower range is 25 to 60 percent by weight. The exact relationship between the quantity of pectin and the quantity of Polyose used in a pectin gel will vary with the particular type of gelled food product being made.

Ordinary commercial pectins form gels by dehydration and electrical neutralization of the colloidally dispersed and highly hydrated pectin agglomerates or micellar aggregates. The pH should preferably be below 3.5, and the concentration of pectin preferably above 0.3 percent by weight, for forming pectin gels. The rate of gel formation depends upon a number of factors such as sugar and pectin concentration, pH, type of pectin, and the temperature. For fixed amounts of the same pectin, the lower the pH and the temperature and the higher the Polyose concentration, the faster the rate of gel. In preparing fruit jellies, it is best to use slow-setting pectins so that, on a commercial scale, capping, labelling, casing and stacking operations can be done before gelation takes place. Pectins which cause rapid gel formation are of particular value in the preparation of jams because thickening and gelation should occur before the solid food rises in the container.

Non-caloric sweetener compositions which can be added to the pectin containing and Polyose containing gelled food products of this invention to keep them at a normal sweetness level include a non-caloric sweetener such as cyclamate and saccharin. The cyclamate can be any of the salts of N-cyclohexyl sulfamic acid or the acid itself as described in Audrieth Patent 2,275,125. Of the salts it is preferred to use an alkali salt such as calcium, sodium, potassium, magnesium, ammonium cyclamate and the like. Sorbitol can also be added to a mixture of non-caloric sweetening agents as shown in the Gordon Patents 2,629,665 and 2,653,105. Sorbitol is nutritive so too much of it should not be used.

Mixtures of cyclamate and saccharin can be substituted for the cyclamate only, provided one bears in mind the fact that saccharin is about 10 times sweeter than cyclamate. If a mixture of cyclamate in saccharin is used the range of amounts of non-caloric sweetening agents used can be defined as follows:

(1) Weight percent of cyclamate+10×weight percent of saccharin=0.005 to 1.5 weight percent of product.

More narrowly:

(2) Weight percent of cyclamate+10×weight percent of saccharin=0.12 to 0.8 weight percent of product.

Either cyclamate or saccharin can be used to the exclusion of the other. Formulae 1 and 2 (above) remain correct when the weight percent of either cyclamate or saccharin is equal to zero. One preferred mixture of sweetening agents contains an alkali cyclamate such as sodium or calcium cyclamate used with saccharin in a cyclamate: saccharin weight ratio of 10:1.

Still other proportions of the low calorie sweeteners can be used as set out in the Gordon patents previously mentioned. In each instance, the quantities to be used in a particular gelled food composition can be readily determined by reference to the sweetness level of such food composition when prepared with usual pectin-gelling agents. However, the dietetic food composition can be made more or less sweet than the non-dietetic food composition, as desired.

The relationship between the amount of Polyose used and the amount of cyclamate and saccharin mixture used in the product can be defined as follows:

(3)
$$\frac{\text{Weight percent of Polyose}}{\text{Weight percent of cyclamate} + 10 \times \text{weight percent of saccharin}} = 5 \text{ to } 500$$

More narrowly:

(4)
$$\frac{\text{Weight percent of Polyose}}{\text{Weight percent of cyclamate} + 10 \times \text{weight percent of saccharin}} = 10 \text{ to } 300$$

Various other materials can be added to a pectin containing foodstuff to assist in forming a gel structure and to improve flavoring in ways understood in the art. For example fruit flavors, spices, salts, and the like can be added to enhance palatability characteristics.

To improve gel structure, glycerol, sorbitol, low methoxyl pectin, starch, pregelatinized starch, gelatin, corn syrup, carboxy methyl cellulose, syrups, alcohols, Irish moss, and the like can be used. But as most of these substances have nutritive content, too much of them should not be used.

In order that the invention can be better understood, the following examples are given. These examples and the proportion shown in them demonstrate gelled food compositions containing pectin, a non-nutritive sweetening agent, and a Polyose as a pectin-gelling agent, in which the fruit juice used contains pectin in amounts typically found in normal fruit juices.

EXAMPLE 1

*Low calorie jellies*

Pectin jellies are made from the juices of fruit containing pectin by boiling out and straining the fruit to separate the juices. The fruit juices used can be separated from the fruit pulp by any standard means such as a rack and cloth, press or the like. Any one of the three general methods of clarifying the juices (centrifuging, filtering and enzymatic) can be used. Fruit juice jellies have a tendency to increase in firmness during the first week after manufacture. The firmness of a fruit juice or jam can be determined by the use of the Exchange Ridgelimeter.

A jelly food composition containing Polyose as a pectin-gelling agent is prepared using the following proportions:

| | | |
|---|---|---|
| Fruit juice (current) | lbs | 72 |
| Polyose C | lbs | 80 |
| Mint flavor | ozs | 2 |
| Green color | ozs | 4 |
| Calcium cyclamate | ozs | 2½ |

Boil until the mixture will form a suitable gel. With the proper amount of pectin and acidity present in the fruit juice, a jelly containing about 60 percent of Polyose and about .12 percent of calcium cyclamate will result.

The time factor of preparing jelly is most important and should not be underrated. The jelly mixture should be concentrated to its finish point as rapidly as possible in order to avoid flavor losses and changes in color and pectin content. Similarly, filling and sealing should be accomplished without time delay.

In order to obtain good, firm jelly, it is desirable to prepare small quantity test batches using varying amounts of Polyose in order to determine the optimum amount of Polyose needed to obtain a good pectin gel. A standard formula once derived can be used for the remainder of the juice in any one total batch. Usually, each test batch consists of about one pound of juice for which the amount of a Polyose needed on gelling varies from about one quarter to one pound.

EXAMPLE 2

*Low calorie jellies*

This example demonstrates the production of a gelled dietetic food composition containing smaller amounts of Polyose than used in the previous example but the amount of pectin and acidity required in this case is greater. The same general techniques are used in the preparation as disclosed above. If sufficient pectin and acidity is not present in the fruit juice, it is necessary to add ingredients to make the mix shown in this example:

| | | |
|---|---|---|
| Fruit juice | lbs | 50 |
| Polyose D | lbs | 15 |
| Powdered pectin | ozs | 6 |
| Powdered citric acid | ozs | 2 |
| Calcium cyclamate | ozs | 8 |

Upon boiling and gelling, the resulting product will contain about 25 percent by weight Polyose and about 0.8 percent calcium cyclamate.

EXAMPLE 3

*Low calorie jams and preserves*

Preserves are jams of semi-solid or viscous foods made by boiling the mixture of fruit and sugar until such mix becomes thick or syrupy. At this point the sugar or sugar substitute (in this case a Polyose), is added. Then the preserves are concentrated to the finishing point by continued cooking in an open kettle, although a vacuum evaporator can be used.

The following proportions by weight of ingredients are here used for making a preserve:

| | | |
|---|---|---|
| Peeled, cored and trimmed peaches | lbs | 8 |
| Polyose B | lbs | 1.6 |
| Powdered pectin | lbs | 0.15 |
| Water | gals | 0.80 |
| Citric acid | lbs | 0.08 |
| Calcium cyclamate | lbs | 0.048 |
| Saccharin | lbs | 0.003 |

When the finish point is reached, the product was hand-packed into containers which were promptly sealed.

The resulting product contains about 10 percent by weight of Polyose and about 0.3 percent calcium cyclamate and about 0.02 percent saccharin.

Other Polyoses such as B, C, or D require less material because of their higher viscosity.

EXAMPLE 4

*Low calorie marmalades*

Marmalades are usually citrous fruit jellies in which sliced or chopped portions of fruit skins are embedded or suspended. Prior to the addition of the skins to fruit pulp and sugar the skins must be removed from the fruit and preferably softened by cooking. Prior to being softened the skins are usually chopped or shredded. The fruit pulp used may be strained or put through a cyclone-finisher to make a more uniform textured product. After skins pulp sugar or sugar substitute (in this case a Polyose) are mixed, the product is then handled the same as a jam or preserve.

A marmalade is prepared using Polyose and pectin by employing the following proportions by weight:

| | | |
|---|---|---|
| Oranges, pulp and skin | lbs | 33 |
| Polyose A | lbs | 67 |
| Powdered pectin | ozs | 4 |
| Citric acid | ozs | 2 |
| Calcium cyclamate | ozs | 1.5 |

The resulting product will contain about 70 percent Polyose and about 0.1 percent calcium cyclamate.

EXAMPLE 5

Low calorie butters

Butters are semi-solid pastes made by cooking a strained fruit pulp or a mixture of fruit pulps that have been concentrated. The fruit is cooked with a small amount of water until it becomes a pulpy mass. Then it can be strained or run through a cyclone-finisher to break the pulp into finely divided particles of uniform texture. The strained pulp is then mixed with the sugar or sugar substitute (in this case a Polyose). Occasionally boiled cider or fresh cider boiled four parts to one is added and the mixture is concentrated to the desired finishing point. If desired spices can be added about ten minutes before cooking is completed. The product is then handled the same as a jam or preserve.

A butter is prepared using a Polyose and pectin by employing the following proportions by weight:

| | | |
|---|---|---|
| Fresh apples | lbs | 6.5 |
| Polyose | lbs | 2.0 |
| Boiled cider | gals | 0.08 |
| Cinnamon | lbs | 0.02 |
| Cyclamate | lbs | 0.03 |

We claim:

1. A dietetic gelled food composition containing pectin and between 25 and 60 composition weight percent of a glucose polymer pectin-gelling agent derived from starch by heat depolymerization followed by heat polymerization to such an extent that between 40 and 67 percent solids give a viscosity of 20 to 100 poises at 70° F., the composition also containing a mixture of sweeteners selected from the group consisting of saccharin and cyclamate.

2. The composition of claim 1 wherein the weight percent of any cyclamate used plus ten times the weight percent of any saccharin used equals .12 to 0.8 weight percent of the composition, such that:

Weight percent of cyclamate+10×weight percent of saccharin=0.12 to 0.8 weight percent of product 3. A dietetic gelled food composition of claim 1 wherein the composition is a jelly.

4. The dietetic gelled food composition of claim 1 wherein the composition is a jam.

5. The dietetic gelled food composition of claim 1 wherein the composition is a marmalade.

6. The dietetic gelled food composition of claim 1 wherein the composition is a butter.

7. A dietetic food composition comprising pectin, at least 10% by weight of a glucose polymer derived from starch by depolymerization followed by heat polymerization to such an extent that between 40 and 67% solids give a viscosity of 20 to 100 poises at 70° F., and at least about 0.005 weight percent of a mixture of at least one sweetening agent selected from the group consisting of cyclamates and saccharin.

8. A dietetic gelled food composition containing pectin, between 10 and 75% by weight of a glucose polymer derived from starch by depolymerization followed by heat polymerization to such an extent that between 40 and 67% solids give a viscosity of 20 to 100 poises at 70° F., and from about 0.005 to 1.5 weight percent of non-nutritive sweetening agents selected from the group consisting of cyclamate and saccharin such that:

Weight percent of cyclamate+10×weight percent of saccharin=0.005 to 1.5 weight percent of product

References Cited in the file of this patent

UNITED STATES PATENTS

| | | |
|---|---|---|
| 1,801,053 | Meigs | Apr. 14, 1931 |
| 2,302,511 | Wallach | Nov. 17, 1942 |
| 2,563,014 | Durand | Aug. 7, 1951 |
| 2,629,665 | Gordon | Feb. 24, 1953 |